United States Patent
Konishi et al.

(10) Patent No.: US 12,447,958 B2
(45) Date of Patent: Oct. 21, 2025

(54) TRAVEL CONTROL APPARATUS

(71) Applicant: Honda Motor Co., Ltd., Tokyo (JP)

(72) Inventors: Tatsuya Konishi, Tokyo (JP); Akinori Oi, Tokyo (JP); Yuya Kaneda, Tokyo (JP); Kenta Ishii, Tokyo (JP); Tomoyuki Yokoyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 346 days.

(21) Appl. No.: 18/126,963

(22) Filed: Mar. 27, 2023

(65) Prior Publication Data

US 2024/0326797 A1 Oct. 3, 2024

(51) Int. Cl.
*B60W 30/00* (2006.01)
*B60W 30/14* (2006.01)
*B60W 50/00* (2006.01)

(52) U.S. Cl.
CPC ............ *B60W 30/14* (2013.01); *B60W 50/00* (2013.01); *B60W 2050/0052* (2013.01); *B60W 2420/403* (2013.01); *B60W 2420/408* (2024.01); *B60W 2554/4041* (2020.02); *B60W 2554/4042* (2020.02)

(58) Field of Classification Search
CPC ................. B60W 30/14; B60W 50/00; B60W 2554/4041; B60W 2554/4042; B60W 2420/408; B60W 2050/0052; B60W 2420/403

USPC .......................................................... 701/93
See application file for complete search history.

(56) References Cited

U.S. PATENT DOCUMENTS

2015/0375744 A1* 12/2015 Kato .................... B60W 30/16
701/96

FOREIGN PATENT DOCUMENTS

CN          108284841 A   *  7/2018
JP          H08122432 A       5/1996

* cited by examiner

*Primary Examiner* — Tiffany P Young
(74) *Attorney, Agent, or Firm* — Duft & Bornsen, PC

(57) ABSTRACT

A travel control apparatus includes: a detection unit configured to detect an exterior environment situation around a subject vehicle; and a microprocessor configured to perform: recognizing, based on a detected value of the detection unit, a traveling state of a preceding vehicle on a current lane; determining, based on a recognized result, whether the preceding vehicle has started a deceleration; estimating a traveling trajectory of the preceding vehicle through a Kalman filter to which a physical quantity representing the traveling state of the preceding vehicle is to be inputted as an input value; and controlling a traveling actuator based on an estimated result to make the subject vehicle follow the preceding vehicle. The estimating includes, when it is determined that the preceding vehicle has started the deceleration, varying a weight for the Kalman filter.

5 Claims, 10 Drawing Sheets

TRAVEL CONTROL APPARATUS

BACKGROUND OF THE INVENTION

Field of the Invention

The present invention relates to a travel control apparatus that controls traveling of a vehicle.

Description of the Related Art

One conventionally known device of the above type is configured to estimate a position of a preceding vehicle through a Kalman filter and then controls acceleration/deceleration of a subject vehicle based on the estimated result so that the subject vehicle can follow the preceding vehicle (see, for example, Japanese Patent Application Laid-Open No. H8-122432).

In the method of estimating the position of the preceding vehicle through the Kalman filter as described in Japanese Patent Application Laid-Open No. H8-122432, the device may fail to accurately estimate the position of the preceding vehicle when the preceding vehicle behaves so as to largely change its physical movement, such as decelerating or turning right or left. In such cases, the device has difficulty appropriately controlling the acceleration/deceleration of the subject vehicle.

SUMMARY OF THE INVENTION

An aspect of the present invention is a travel control apparatus including: a detection unit configured to detect an exterior environment situation around a subject vehicle; and a microprocessor and a memory coupled to the microprocessor. The microprocessor is configured to perform: recognizing, based on a detected value of the detection unit, a traveling state of a preceding vehicle traveling ahead of the subject vehicle on a current lane on which the subject vehicle is traveling; determining, based on a recognized result in the recognizing, whether the preceding vehicle has started a deceleration; estimating a traveling trajectory of the preceding vehicle through a Kalman filter to which a physical quantity representing the traveling state of the preceding vehicle is to be inputted as an input value; and controlling a traveling actuator based on an estimated result in the estimating to make the subject vehicle follow the preceding vehicle. The estimating including, when it is determined that the preceding vehicle has started the deceleration, varying a weight for the Kalman filter.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 8. A vehicle control system according to the embodiment of the present invention is applicable to a vehicle equipped with a driving assist capability or a self-driving capability. An example of an application of the travel control apparatus to a vehicle (self-driving vehicle) equipped with the self-driving capability will be described below. A vehicle to which the travel control apparatus according to this embodiment is applied may be referred to as a subject vehicle in order to distinguish it from other vehicles. The subject vehicle can travel not only in a self-drive mode that does not require a driver's driving operation but also in a manual drive mode that requires the driver's driving operation.

Figure 1:
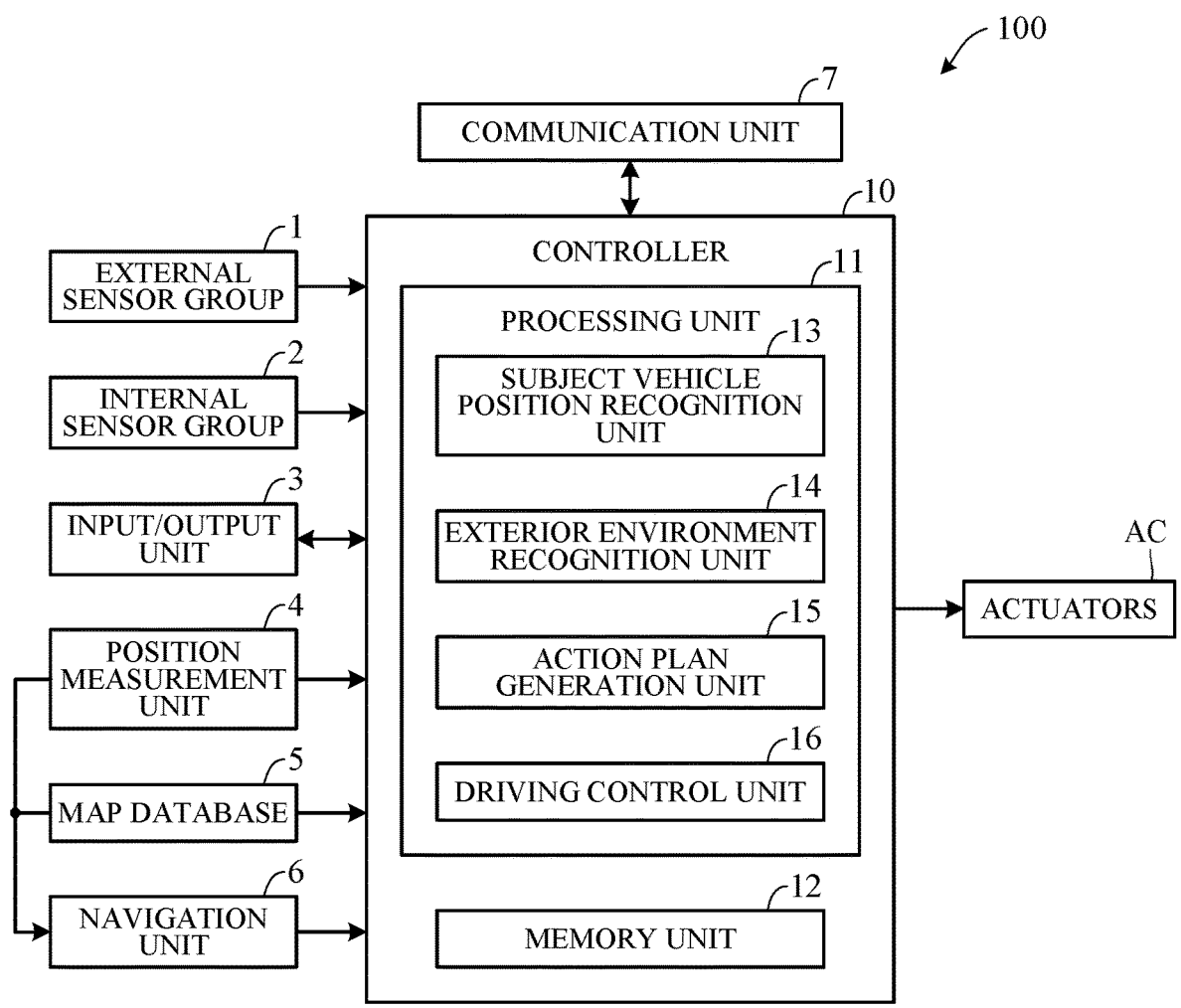
FIG. 1 is a schematic block diagram of an overall configuration of a vehicle control system according to an embodiment of the present invention.

FIG. 1 is a schematic block diagram of an overall configuration of a vehicle control system (vehicle control device) 100 according to this embodiment. As illustrated in FIG. 1, the vehicle control system 100 includes, as its main components, a controller 10 as well as an external sensor group 1, an internal sensor group 2, an input/output device 3, a positioning sensor 4, a map database 5, a navigation unit 6, a communication unit 7, and traveling actuators (hereinafter simply referred to as actuators) AC, all of which are electrically connected to the controller 10.

The external sensor group 1 is a generic term for a plurality of sensors that detect an exterior environment situation, which is information on a situation around the subject vehicle. For example, the external sensor group 1 includes: a LiDAR that determines a distance from the subject vehicle to a surrounding obstacle by measuring scattering of irradiation light emitted in all directions from the subject vehicle; and a radar that detects other vehicles, obstacles, and other objects around the subject vehicle by irradiating them with electromagnetic waves and detecting the reflected waves. Furthermore, for example, the external sensor group 1 includes a camera and a microphone mounted on the subject vehicle. The camera, which has an imaging element, such as a charge coupled device (CCD) or a complementary metal oxide semiconductor (CMOS), captures images areas (forward, backward, and sideward areas) around the subject vehicle; the microphone picks up sound around the subject vehicle and outputs a signal corresponding to this sound. The external sensor group 1 detects or receives a signal and then transmits it to the controller 10.

The internal sensor group 2 is a generic term for a plurality of sensors that detect traveling states of the subject vehicle and a state inside the subject vehicle. Examples of the internal sensor group 2 include a vehicle velocity sensor that detects a velocity of the subject vehicle, an acceleration sensor that detects an acceleration in a traveling direction of the subject vehicle and an acceleration in a lateral direction (lateral acceleration) of the subject vehicle, a revolution sensor that detects the number of revolutions of a traveling drive source, and a yaw rate sensor that detects a rotation angular velocity around a vertical axis of the center of gravity of the subject vehicle. The internal sensor group 2 also includes sensors that detect a driver's driving operations, such as operations of an accelerator pedal, a brake pedal, and a steering wheel, during a manual drive mode. The internal sensor group 2 generates a detection signal and then transmits it to the controller 10.

The input/output device 3 is a generic term for devices via which the driver transmits or receives commands. Examples of the input/output device 3 include: various switches via which the driver transmits various commands by operating an operation member; a microphone via which the driver transmits a command in a voice form; a display unit via which the driver receives information in an image form; and a speaker via which the driver receives information in a sound form. These switches include a manual/automatic switch (SW) by which either a self-drive mode or a manual drive mode is designated.

The manual/automatic switch is formed as a switch that is manually operable by a driver, for example, and outputs a command of switching to the self-drive mode in which a self-driving capability is enabled or the manual drive mode in which the self-driving capability is disabled in accordance with a driver's switch operation. If a predetermined traveling condition is satisfied independently of the operation of the manual/automatic switch, the manual/automatic switch may instruct the switching from the manual drive mode to the self-drive mode or from the self-drive mode to the manual drive mode. In other words, if the manual/automatic switch enables automatic switching in this manner, the modes can be switched automatically instead of manually.

The positioning sensor 4, which is implemented by a GPS sensor, for example, receives a positioning signal from a GPS satellite and measures an absolute position (e.g., latitude and longitude) of the subject vehicle based on the received signal. The positioning sensor 4 includes, in addition to the GPS sensor, a sensor that measures the position of the subject vehicle by using radio waves received from a quasi-zenith orbit satellite. The positioning sensor 4 then generates a signal (indicating a measured result) and transmits it to the controller 10.

The map database 5 is a device, such as a hard disk, that stores typical map information to be used by the navigation unit 6. This map information contains road position information, information on a road shape (e.g., curvature) and position information on intersections and branch points. The map information stored in the map database 5 is different from high-precision map information stored in the memory unit 12 of the controller 10.

The navigation unit 6 is a device that searches for a target route to a destination on a road which is entered by a driver and guides the driver along the target route. The navigation unit 6 provides the entry of the destination and the guidance along the target route via the input/output device 3. The navigation unit 6 calculates the target route, based on both a current position of the subject vehicle measured by the positioning sensor 4 and the map information stored in the map database 5.

The communication unit 7 communicates with various servers (not illustrated) via a network including a wireless communication network, such as an Internet line, and then acquires the map information, traffic information, and other information from the server at periodic or predetermined timings. The communication unit 7 outputs the acquired map information to the map database 5 and the memory unit 12, in which the map information is then updated. The acquired traffic information contains traffic congestion information and traffic light information, such as a remaining time until a traffic light changes from red to green.

Each actuator AC is an apparatus that activates various apparatus related to the traveling operation of the subject vehicle.

Each actuator AC includes a brake actuator that operates a braking device, a steering actuator that drives a steering device, and the like. Each actuator AC is a traveling actuator for use in controlling traveling of the subject vehicle. If the traveling drive source is an engine, the actuators AC include a throttle actuator that adjusts an opening (throttle opening) of a throttle valve in the engine. If the traveling drive source is a traveling motor, the traveling motor is included in the actuators AC. The actuators AC include a brake actuator that operates the braking device in the subject vehicle and a steering actuator that drives the steering device.

The controller 10 includes an electronic control unit (ECU). Although the controller 10 separately includes a plurality of ECUs with different functions, such as an engine control ECU and a transmission control ECU, the controller 10 illustrated in FIG. 1 includes a single ECU as a set of those ECUs, for convenience. The controller 10 is implemented by a computer that includes: a processing unit 11, such as a central processing unit (CPU); a memory unit 12, such as read-only memory (ROM), random-access memory (RAM), and a hard disk drive; and other peripheral circuits (not illustrated).

The memory unit 12 stores the high-precision map information, which contains information on a central position of a lane, information on boundaries of a lane, and other information. More specifically, the memory unit 12 stores, as this road information, traffic regulation information, address information, facility information, telephone number information, and other information. The road information contains information indicating the types of roads, such as a highway, a toll road, and a national highway, and information on the number of lanes on a road, the width of each lane, a road gradient, a three-dimensional coordinate position of the road, a curvature of a curve of the lane, positions of the merging point and branch point of the lane, a road sign, and the presence or absence of a median strip. The traffic regulation information contains information indicating that traveling on a lane is restricted or prohibited due to construction work, for example. The memory unit 12 also stores information on a shift map (shift diagram) to be used as a reference of a shift operation, various control programs, and a threshold to be used in these programs.

The processing unit 11 includes a subject vehicle position recognition unit 13, an exterior environment recognition unit 14, an action plan generation unit 15, and a driving control unit 16, as functional components related to automatic traveling.

The subject vehicle position recognition unit 13 recognizes a position (subject vehicle position) of the subject vehicle on a map, based on both the position information on the subject vehicle received from the positioning sensor 4 and the map information on the map database 5. The subject vehicle position recognition unit 13 may use the map information (e.g., information on the shape of a building) stored in the memory unit 12 and the peripheral information of the subject vehicle detected by the external sensor group 1 to recognize the subject vehicle position. In this way, the subject vehicle position recognition unit 13 can recognize the subject vehicle position with high accuracy. For example, the subject vehicle position recognition unit 13 may use the map information stored in the memory unit 12 and the image data around the subject vehicle picked up by the camera of the external sensor group 1 to recognize the subject vehicle position. If the subject vehicle position can be measured by a sensor installed on a road or outside a side of the road, the controller 10 may communicate with this sensor via the communication unit 7 to recognize the subject vehicle position with high accuracy.

The exterior environment recognition unit 14 recognizes an exterior environment situation around the subject vehicle, based on signals from the external sensor group 1, such as a LiDAR, a radar, and a camera. For example, the exterior environment recognition unit 14 recognizes the position, velocity, and acceleration of a surrounding vehicle (a forward vehicle or a rearward vehicle) traveling around the subject vehicle, the position of a surrounding vehicle stopped or parked around the subject vehicle, and the positions and states of other objects. Other objects include signs, traffic lights, road boundaries, road stop lines, buildings, guardrails, utility poles, signboards, pedestrians, and bicycles. The states of other objects include a color (red, green, yellow) of a traffic light and the moving velocity and direction of a pedestrian or a bicycle.

The action plan generation unit 15 generates a driving path (target path) along which the subject vehicle will travel from a present time to a predetermined time, for example, based on the target route calculated by the navigation unit 6, the subject vehicle position recognized by the subject vehicle position recognition unit 13, and the exterior environment situation recognized by the exterior environment recognition unit 14. When there are a plurality of paths as candidates for the target path on the target route, the action plan generation unit 15 selects, from among these paths, an optimal one that satisfies some criteria in terms of compliance with laws and regulations and efficient and safe traveling and then sets the target path to this selected path. The action plan generation unit 15 then generates an action plan in accordance with the generated target path.

The action plan contains traveling plan data to be set at intervals of a unit time Δt (e.g., 0.1 second) from the present time to a predetermined time T (e.g., 5 seconds), namely, traveling plan data to be set in relation to time points at the intervals of the unit time Δt.

The travel plan data contains position data of the subject vehicle and vehicle state data at each unit time. For example, the position data is data of a target point indicating a two-dimensional coordinate position on the road; the vehicle state data is vehicle velocity data indicating the vehicle velocity and direction data indicating the direction of the subject vehicle. The travel plan is updated at the intervals of the unit time.

The action plan generation unit 15 generates the target path by connecting, in order of time, the pieces of position data set at the intervals of the unit time Δt from the present time to the predetermined time T. In this case, the action plan generation unit 15 calculates the acceleration (target acceleration) at each unit time Δt, based on the vehicle velocity (target vehicle velocity) at a target point and each unit time Δt on the target path. More specifically, the action plan generation unit 15 calculates both the target vehicle velocity and the target acceleration. Alternatively, instead of the action plan generation unit 15, the driving control unit 16 may calculate the target acceleration.

When generating the target path, the action plan generation unit 15 first determines a travel mode. More specifically, the action plan generation unit 15 determines the travel mode, such as following travel for following a forward vehicle, overtaking traveling for overtaking the forward vehicle, lane change traveling for changing a traveling lane, merging traveling for merging into a main line of a highway or a toll road, lane keeping traveling for keeping the lane so as not to deviate from the traveling lane, constant velocity traveling, deceleration traveling, or acceleration traveling. The action plan generation unit 15 then generates the target path, based on the travel mode.

During the self-drive mode, the driving control unit 16 controls each actuator AC so that the subject vehicle can travel along the target path generated by the action plan generation unit 15. More specifically, the driving control unit 16 controls the throttle actuator, the shift actuator, the brake actuator, and the steering actuator, and other actuators so that the subject vehicle can pass through the target points P at the respective unit times.

More specifically, the driving control unit 16 calculates a driving force required to obtain the target acceleration per unit time calculated by the action plan generation unit 15 in consideration of a travel resistance determined by a road gradient, for example, during the self-drive mode. The driving control unit 16 feedback-controls each actuator AC so that an actual acceleration detected by the internal sensor group 2, for example, becomes equal to the target acceleration. In other words, the driving control unit 16 controls each actuator AC so that the subject vehicle can travel at the target vehicle velocity and acceleration. During the manual drive mode, the driving control unit 16 controls each actuator AC in accordance with a driver's travel command (e.g., accelerator opening) acquired by the internal sensor group 2.

Figure 2A:
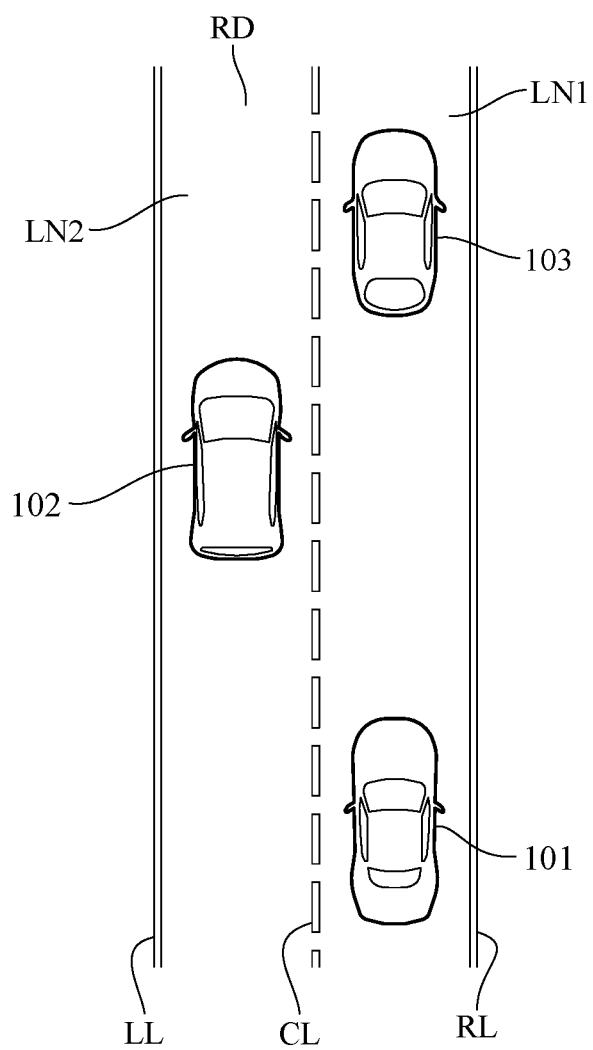
FIG. 2A is a diagram of an example of a scene in which a subject vehicle 101 is traveling.

During a following travel mode in which the subject vehicle travels so as to follow another vehicle (preceding vehicle) traveling ahead, the subject vehicle travels so as to keep a constant inter-vehicle distance from the preceding vehicle, with the exterior environment recognition unit 14 recognizing a traveling position and a traveling velocity, for example, of the preceding vehicle based on sensor values obtained from a camera and other sensors. FIG. 2A is a view of an example of a scene in which a subject vehicle 101 is traveling. In FIG. 2A, the subject vehicle 101 is following a preceding vehicle 103. In a traveling scene as illustrated in FIG. 2A, if the sensor value contains noise and the subject vehicle 101 performs following travel in accordance with a traveling velocity, for example, of the preceding vehicle 103 recognized based on this sensor value, the subject vehicle 101 may repeat unnecessary acceleration and deceleration even when the preceding vehicle 103 travels steadily. To suppress such unnecessary acceleration/deceleration, a method has been proposed to estimate a traveling position and a traveling velocity, for example, of the preceding vehicle 103 through the Kalman filter and then to cause the subject vehicle to follow the preceding vehicle based on those estimated values (state values).

Figure 2B:
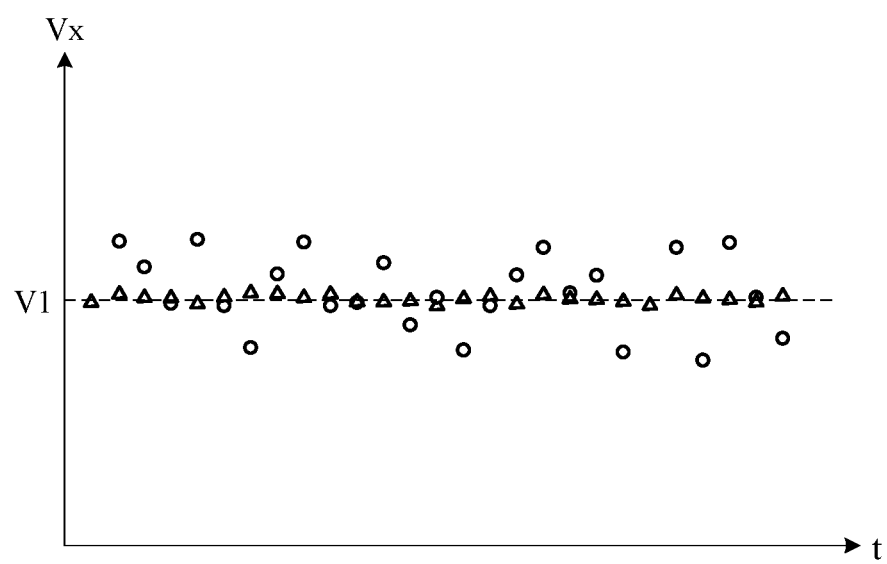
FIG. 2B is a diagram of an example of the traveling velocity of the preceding vehicle 103 estimated through the Kalman filter.

FIG. 2B is a diagram of an example of the traveling velocity of the preceding vehicle 103 estimated through the Kalman filter. FIG. 2B illustrates an example case in which the preceding vehicle 103 is traveling steadily at a (constant) traveling velocity V1. In the graph of FIG. 2B, the vertical axis represents a longitudinal velocity Vx in the traveling direction of the preceding vehicle 103, and the horizontal axis represents a time t. In FIG. 2B, the circular marks each represent an observed value, namely, the traveling velocity of the preceding vehicle obtained based on the camera image. The triangular marks each represent an estimated value, more specifically, an estimated value of the traveling velocity of the preceding vehicle 103 obtained by inputting the observed value in the Kalman filter. In short, each triangular mark represents a calculated result from the Kalman filter. By estimating the traveling velocity of the preceding vehicle through the Kalman filter, as illustrated in FIG. 2B, a recognized result obtained reflects the influence of the noise contained in the sensor value, namely, is approximated to a true value V1. By using the recognized result obtained in this manner for the travel control, good following travel can be achieved. However, if the Kalman filter is modeled for steady traveling, namely, if parameters for the Kalman filter are set so that the responsiveness to the acceleration/deceleration of the preceding vehicle 103 in the traveling direction decreases, when the preceding vehicle 103 accelerates or decelerates during the steady traveling, it may take a long time until the calculated result (output value) from the Kalman filter converges. In such cases, it may be difficult to promptly recognize the acceleration/deceleration of the preceding vehicle 103. Thus, when the preceding vehicle 103 suddenly decelerates, for example, the subject vehicle 101 may excessively approach or come into contact with the preceding vehicle 103. To address such problems, this embodiment provides a travel control apparatus having the following configuration.

Figure 3:
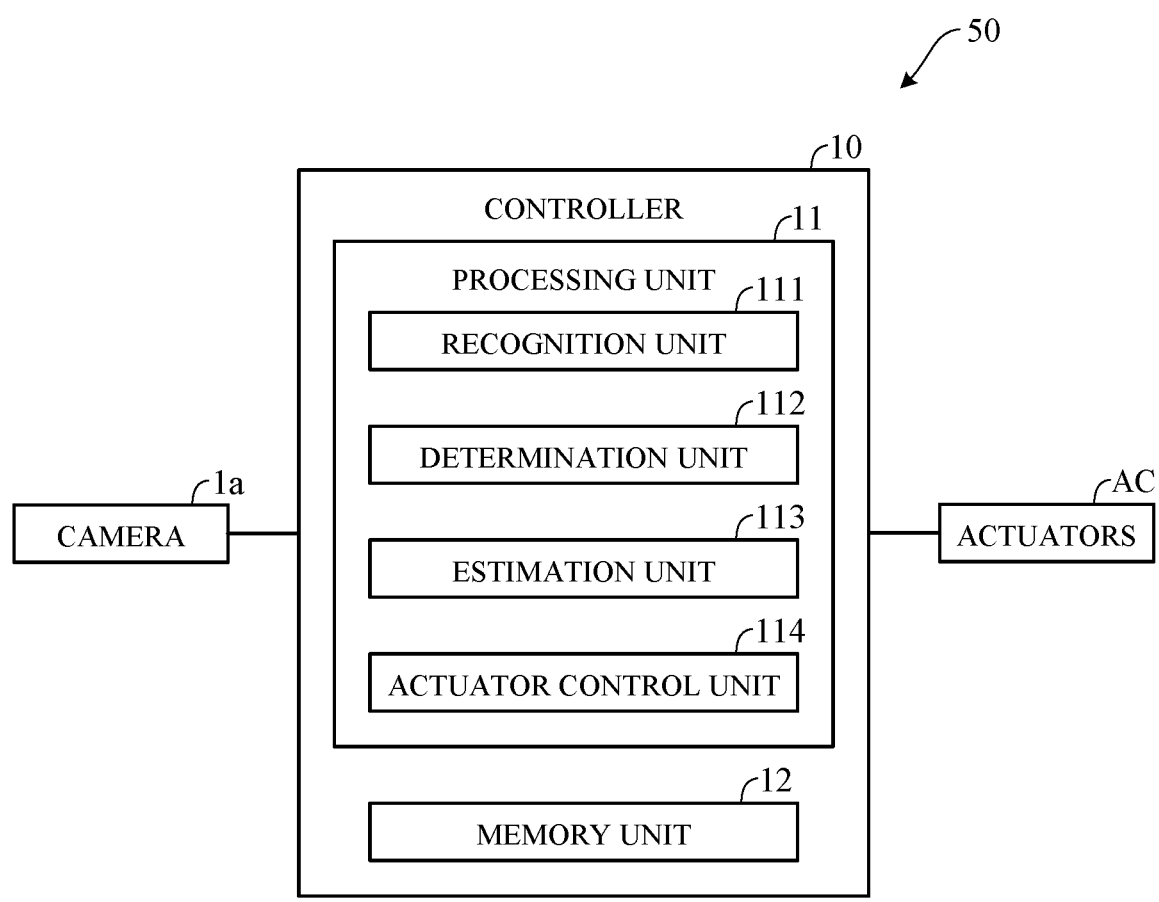
FIG. 3 is a block diagram of a configuration of a key part of a travel control apparatus according to this embodiment.

FIG. 3 is a block diagram of a configuration of a key part of a travel control apparatus according to this embodiment. The travel control apparatus 50 forms a part of the vehicle control system 100 illustrated in FIG. 1. As illustrated in FIG. 3, the travel control apparatus 50 includes the controller 10, a camera 1*a*, and the actuators AC. The camera 1*a*, which is implemented by a monocular camera having an imaging element (image sensor), such as a CCD or a CMOS, forms a part of the external sensor group 1 in FIG. 1. Alternatively, the camera 1*a* may be implemented by a stereo camera. The camera 1*a* is mounted in a front portion of the subject vehicle 101 at a predetermined position, for example, to continuously pick up images of a space ahead of the subject vehicle to acquire images of the target object. Examples of such target objects include road marks and division lines on a road and traffic signs and structures installed on or near the road. Instead of or in addition to the camera 1*a*, target objects may be detected by a LiDAR or a radar.

In the controller 10, as illustrated in FIG. 3, the processing unit 11 (see FIG. 1) includes, as functional components, a recognition unit 111, a determination unit 112, an estimation unit 113, and an actuator control unit 114. In addition, the controller 10 further includes the memory unit 12.

The recognition unit 111 recognizes the preceding vehicle 103 traveling ahead of the subject vehicle 101 on a current lane LN1, based on an exterior environment situation around the subject vehicle 101 detected by the camera 1*a*. More specifically, the recognition unit 111 first recognizes division lines LL, CL, and RL that define both the current lane LN1 and an adjacent lane LN2 of a road RD on which the subject vehicle 101 is traveling, based on image data (referred to below as camera image data or simply as a camera image) acquired by the camera 1*a*. The recognition unit 111 then recognizes target objects (vehicles 102 and 103 in the example of FIG. 2A) around the subject vehicle 101, based on the camera image. In this case, the recognition unit 111 recognizes the preceding vehicle 103 traveling on the current lane LN1 ahead of the subject vehicle 101, based on the result of recognizing the division lines and the target object.

When recognizing the preceding vehicle 103, the recognition unit 111 acquires a physical quantity that represents a traveling state of the preceding vehicle 103, based on the camera image from the camera 1*a*. In addition, the recognition unit 111 also recognizes the traveling state of the preceding vehicle 103, based on the camera image from the camera 1*a*. The traveling state encompasses steady traveling (constant velocity traveling), deceleration traveling, or right/left turn, for example. The physical quantity that represents the traveling state of the preceding vehicle 103 encompasses a traveling position, a traveling velocity, and a traveling acceleration of the preceding vehicle 103. Then, the determination unit 112 determines whether the traveling state recognized by the recognition unit 111 has changed.

The estimation unit 113 inputs, in the Kalman filter as an input value (observed value), the physical quantity acquired by the recognition unit 111, thereby estimating a traveling trajectory of the preceding vehicle 103. In addition, when the determination unit 112 determines that the preceding vehicle 103 has started deceleration, the estimation unit 113 varies a weight for the Kalman filter.

The actuator control unit 114 controls each actuator AC based on the estimated result from the estimation unit 113 so that the subject vehicle 101 can follow the preceding vehicle 103.

The process in which the estimation unit 113 varies the weight for the Kalman filter will be described. The above input value for the Kalman filter contains: a traveling position (referred to below as a longitudinal position) Px in the traveling direction of the preceding vehicle 103; a traveling position (referred to as a lateral position) Py in a lane width direction; a traveling velocity (referred to below as a longitudinal velocity) Vx in the traveling direction of the preceding vehicle 103; a traveling velocity (referred to below as a lateral velocity) Vy in the lane width direction; a traveling acceleration (referred to below as a longitudinal acceleration) Ax in the traveling direction of the preceding vehicle 103; and a traveling acceleration (referred to as a lateral acceleration) Ay in the lane width direction. In this case, the input value may contain other pieces of information, such as a width and height of the preceding vehicle 103. It should be noted that, instead of or in addition to the longitudinal position and the horizontal position, a distance (referred to below as a longitudinal distance) in the traveling direction between the subject vehicle 101 and the preceding vehicle 103 and the position in the lane width direction (referred to below as the lateral position) may be used.

As the weight added to each input value increases, the responsiveness of the calculated result (estimated value) from the Kalman filter to the input value increases. In other words, as the weight is set to a larger value, the estimated value converges faster in response to variations in each input value. When the subject vehicle 101 follows the preceding vehicle 103 with the responsiveness to the acceleration/deceleration of the preceding vehicle 103 increasing, the subject vehicle 101 tends to accelerate/decelerate in response to the acceleration or deceleration of the preceding vehicle 103, which may make a passenger in the subject vehicle 101 feel uncomfortable. Therefore, when the subject vehicle 101 is following another vehicle, the estimation unit 113 sets parameters for the Kalman filter so that the responsiveness to the longitudinal position Px, the longitudinal velocity Vx, and the longitudinal acceleration Ax of the preceding vehicle 103 decreases. On the other hand, if the Kalman filter is modeled for steady traveling, when the preceding vehicle 103 decelerates, the subject vehicle 101 may fail to promptly respond to the deceleration of the preceding vehicle 103, in which case the subject vehicle 101 may excessively approach the preceding vehicle 103, as described above. Therefore, when the determination unit 112 determines that the preceding vehicle 103 has started deceleration at or above a predetermined rate, namely, when it determines that the traveling state of the preceding vehicle 103 has changed from the steady traveling to the deceleration traveling, the estimation unit 113 switches the Kalman filter from the steady travel model to the deceleration travel model. More specifically, the estimation unit 113 sets the parameters for the Kalman filter, concretely, resets a variance-covariance matrix that represents the certainty of the estimated value so that the responsiveness to the longitudinal position Px, the longitudinal velocity Vx, and the longitudinal acceleration Ax increases.

Instead of setting the parameters for the Kalman filter, the estimation unit 113 may add a weight to the physical quantity acquired by the recognition unit 111 and input the resultant value to the Kalman filter. More specifically, the estimation unit 113 may add weights to the longitudinal position Px, the longitudinal velocity Vx, and the longitudinal acceleration Ax so that the responsiveness to the longitudinal position Px, the longitudinal velocity Vx, and the longitudinal acceleration Ax increases. For example, the estimation unit 113 may add weights to the longitudinal position Px, the longitudinal velocity Vx, and the longitudinal acceleration Ax so that their absolute values increase. Alternatively, the estimation unit 113 may add a weight to any of the longitudinal position Px, the longitudinal velocity Vx, and the longitudinal acceleration Ax.

Figure 4:
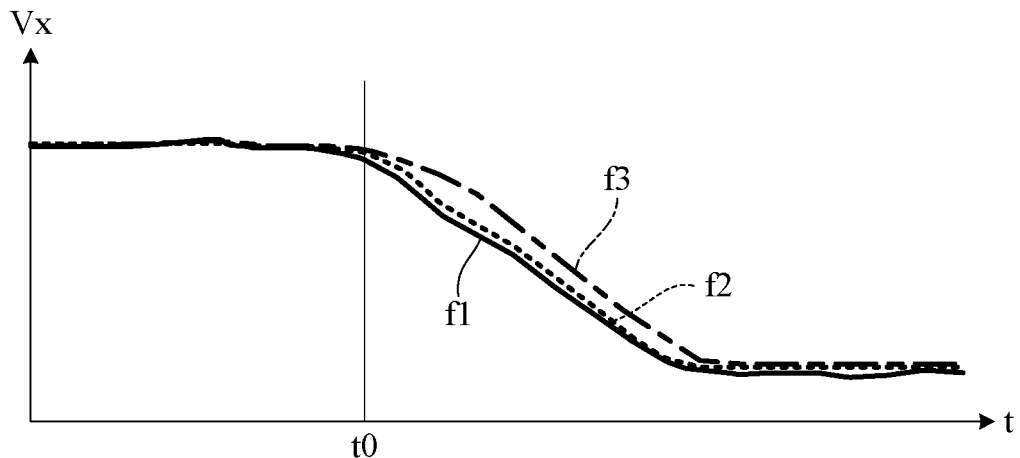
FIG. 4 is a diagram of an example of a result of calculation through the Kalman filter when the preceding vehicle starts deceleration.

FIG. 4 is a diagram of an example of a result of calculation through the Kalman filter when the preceding vehicle 103 starts deceleration. In the graph of FIG. 4, the vertical axis represents the longitudinal velocity Vx of the preceding vehicle 103, and the horizontal axis represents a time t. A time to represents a time point at which the preceding vehicle 103 starts deceleration. A characteristic f1 represents a sensor value, more specifically, the longitudinal velocity Vx of the preceding vehicle 103 recognized based on the camera image from the camera 1a. Characteristics f2 and f3 each represent a calculated result from the Kalman filter, namely, the longitudinal velocity Vx of the preceding vehicle 103 estimated through the Kalman filter. More specifically, the characteristic f2 represents the calculated result from the Kalman filter in a case where the Kalman filter is switched from the steady travel model to the deceleration travel model at the time to. The characteristic f3 represents a calculated result from the Kalman filter in a case where the steady travel model is continuously applied after the time to.

When comparing between the characteristics f2 and f3 immediately after the time to in FIG. 4, it can be seen that, after the time to, the calculated result (estimated value) obtained when the steady travel model is switched to the deceleration travel model at the time to is closer to the sensor value than that obtained when the steady travel model is continuously applied. Therefore, by controlling the traveling of the subject vehicle 101 based on the estimated value represented by the characteristic f2 so that the subject vehicle 101 follows the preceding vehicle 103, it is possible to prevent the subject vehicle 101 from excessively approaching or coming into contact with the preceding vehicle 103 even when the preceding vehicle 103 suddenly decelerates.

Figure 5:
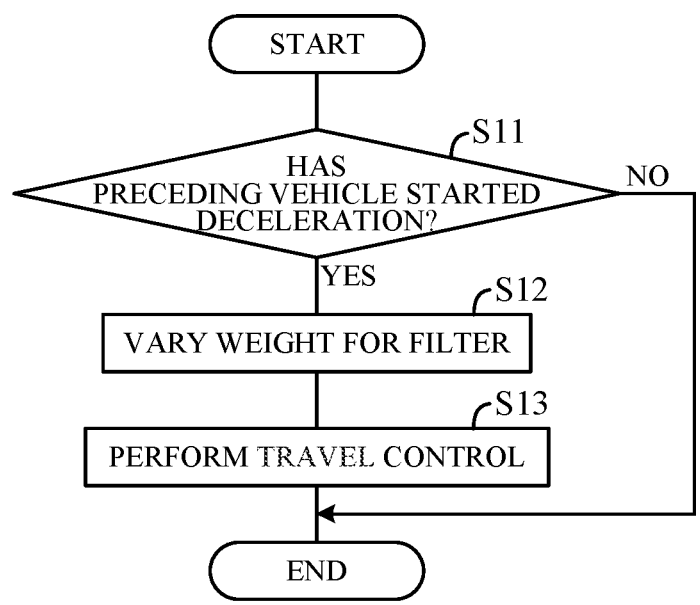
FIG. 5 is a flowchart of an example of a process performed by the controller in FIG. 3.

FIG. 5 is a flowchart of an example of a process performed by the controller 10. The process depicted in this flowchart is repeated at a predetermined cycle, for example, when the following travel function of the subject vehicle 101 is activated. Here, an example traveling scene in which the subject vehicle 101 is following the preceding vehicle 103, as illustrated in FIG. 2A, will be explained. When the following travel function of the subject vehicle 101 is activated, the Kalman filter is set to the steady travel model.

In Step S11, the controller 10 first determines whether the preceding vehicle 103 has started deceleration at or above a predetermined rate, based on the camera image. When the determined result is negative (NO) in Step S11, the controller 10 terminates this process. When the determined result is positive (YES) in Step S11, the controller 10 varies the weight for the Kalman filter in Step S12. More specifically, the controller 10 switches the Kalman filter from the steady travel model to the deceleration travel model. In Step S13, the controller 10 performs travel control. Concretely, the controller 10 controls each actuator AC based on the calculated result from the Kalman filter, namely, based on a traveling trajectory of the preceding vehicle 103 estimated through the Kalman filter so that the subject vehicle 101 can follow the preceding vehicle 103.

When the preceding vehicle 103 finishes the deceleration, the controller 10 switches the Kalman filter to the steady travel model. For example, when the recognition unit 111 recognizes that the preceding vehicle 103 has inputted a stopped state, a constant velocity traveling state, or an acceleration state, the controller 10 determines that the preceding vehicle 103 has finished the deceleration.

According to the foregoing embodiment, a travel control apparatus 50 successfully provides the following functions and effects.

(1) The travel control apparatus 50 includes: a camera 1a that detects an exterior environment situation around a subject vehicle 101; a recognition unit 111 that recognizes, based on a detected value (camera image) of the camera 1a, a traveling state of a preceding vehicle 103 traveling ahead of the subject vehicle 101 on a current lane LN1 on which the subject vehicle 101 is traveling; a determination unit 112 that determines, based on a recognized result from the recognition unit 111, whether the preceding vehicle 103 will start deceleration; an estimation unit 113 that estimates a traveling trajectory of the preceding vehicle 103 through a Kalman filter to which a physical quantity that represents a traveling state of the preceding vehicle 103 is to be inputted as an input value; and an actuator control unit 114 that controls a traveling actuator AC based on an estimated result from the estimation unit 113 so that the subject vehicle 101 can follow the preceding vehicle 103. When the determination unit 112 determines that the preceding vehicle 103 has started deceleration, the estimation unit 113 varies a weight for the Kalman filter. A physical quantity that represents the traveling state of the preceding vehicle 103 encompasses at least one of a traveling velocity, a traveling position, and a traveling acceleration in a traveling direction of the preceding vehicle 103. To vary the weight for the Kalman filter, the estimation unit 113 adds the weight to this physical quantity and then inputs the resultant value in the Kalman filter or varies a parameter for the Kalman filter in accordance with the physical quantity. In this way, the subject vehicle 101 can reliably follow the preceding vehicle 103 even after the preceding vehicle 103 has started deceleration. Consequently, it is possible to keep an appropriate inter-vehicle distance between the subject vehicle 101 and the preceding vehicle 103 after the preceding vehicle 103 has started deceleration.

When the subject vehicle 101 is following the preceding vehicle 103, if the preceding vehicle 103 followed by the subject vehicle 101 is wobbling (being displaced in the lane width directions), a passenger in the subject vehicle 101 may feel uncomfortable since the subject vehicle 101 is also wobbling according to the wobbling of the preceding vehicle 103. In this case, the parameter for the Kalman filter set to the steady travel model is set so that the responsiveness to the displacements of the preceding vehicle 103 in the lane width directions decreases. On the other hand, in the case where the preceding vehicle 103 turns right, for example, in order to enter a parking lot in a commercial facility or other facility beside a road, when the recognition unit 111 recognizes blinking of a direction indicator (right direction indicator) provided at the rear of the preceding vehicle 103, the determination unit 112 determines that the preceding vehicle 103 is decelerating in order to turn right, and the actuator control unit 114 causes the subject vehicle 101 to decelerate so as not to excessively approach the preceding vehicle 103. Then, when the preceding vehicle 103 starts turning right, the actuator control unit 114 causes the subject vehicle 101 to re-accelerate so as to pass by the left side of the preceding vehicle 103. In this case, the actuator control unit 114 preferably causes the subject vehicle 101 to re-accelerate before the preceding vehicle 103 finishes leaving the current lane (Hereinafter, leaving the current lane is referred to as cut-out), namely, before the entire body of the preceding vehicle 103 has moved out of the current lane and then to pass by the left side of the preceding vehicle 103. However, if the parameter for the Kalman filter is set so that the responsiveness to the displacements of the preceding vehicle 103 in the lane width directions decreases as described above, the recognition unit 111 may misrecognize that the traveling position of the preceding vehicle 103 in the lane width direction when it is turning right is shifted from the actual position toward the left side. In this case, when the actuator control unit 114 controls the traveling of the subject vehicle 101 based on the estimated value, the subject vehicle 101 re-accelerates later than a timing when it should do. As a result, the subject vehicle 101 may disturb smooth traffic and makes a passenger in the subject vehicle 101 feel uncomfortable. To address such problems, this embodiment provides a travel control apparatus having the following configuration.

Figure 6A:
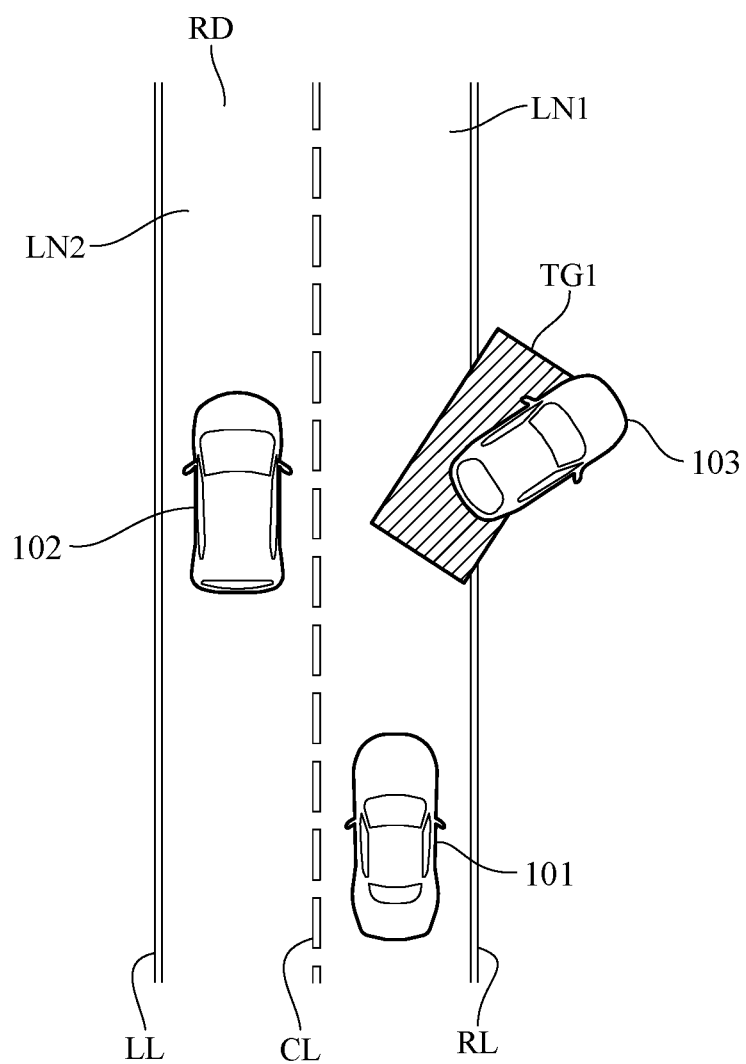
FIG. 6A is a diagram of another example of the scene in which the subject vehicle 101 is traveling.
Figure 6B:
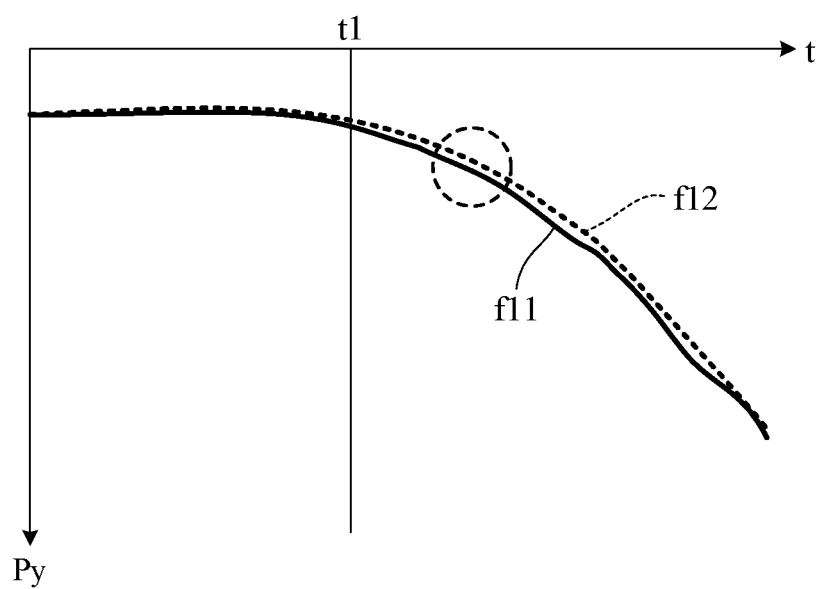
FIG. 6B is a diagram of an example of a calculated result from the Kalman filter set to the steady travel model.

FIG. 6A is a diagram of a view of another example of the scene in which the subject vehicle 101 is traveling. FIG. 6B is a diagram of an example of a calculated result from the Kalman filter set to the steady travel model. FIG. 6A illustrates a traveling scene in which the preceding vehicle 103 followed by the subject vehicle 101 is turning right. FIG. 6B illustrates the lateral position Py of the preceding vehicle 103 estimated through the Kalman filter set to the steady travel model, in the travel scene of FIG. 6A. In the graph of FIG. 6B, the vertical axis represents the lateral position Py of the preceding vehicle 103, and the horizontal axis represents a time t. A time t1 represents a time point at which the preceding vehicle 103 starts turning right. A characteristic f11 represents a sensor value, more specifically, the lateral position Py of the preceding vehicle 103 recognized based on the camera image from the camera 1a. A characteristic f12 represents a calculated result from the Kalman filter, namely, the lateral position Py of the preceding vehicle 103 estimated through the Kalman filter. As can be seen from the area surrounded by a broken line circle in FIG. 6B, the lateral position Py of the preceding vehicle 103 estimated through the Kalman filter set to the steady travel model is misrecognized as being shifted from the actual position indicated by the sensor value toward the left side (upper side in FIG. 6B) in the traveling direction, after the time t1. In FIG. 6A, a rectangle TG1 schematically represents the traveling position of the preceding vehicle 103 estimated through the Kalman filter set to the steady travel model. When the determination unit 112 determines whether the preceding vehicle 103 has made a cut-out, that is, left the current lane LN1, based on the estimated result as illustrated in FIGS. 6A and 6B, the recognition unit 111 tends to misrecognize the preceding vehicle 103 to be positioned shifted from its actual position toward the left side in the traveling direction. As a result, the subject vehicle 101 may re-accelerate later than when it should do to pass by the left side of the preceding vehicle 103.

In consideration of the above, when the determination unit 112 determines that the preceding vehicle 103 has started turning right, the estimation unit 113 varies the weight for the Kalman filter. More specifically, the estimation unit 113 sets the parameters for the Kalman filter, concretely, changes the variance-covariance matrix to switch the Kalman filter from the steady travel model to a leaving determination model (also referred to as cut-out determination model) so that the responsiveness to the lateral position Py, the lateral velocity Vy, and the lateral acceleration Ay of the preceding vehicle 103 increases. When the recognition unit 111 recognizes a right-turn state of the preceding vehicle 103, the determination unit 112 determines that the preceding vehicle 103 has started to turn right. In addition, when recognizing blinking of a direction indicator (right direction indicator) provided at the rear of the preceding vehicle 103 based on the camera image from the camera 1a, the recognition unit 111 recognizes that the traveling state of the preceding vehicle 103 is the right-turn state. If another lane is present on the side of the current lane LN1 to which the preceding vehicle 103 is turning, the recognition unit 111 recognizes that the traveling state of the preceding vehicle 103 is neither the right nor the left turn state but a lane change state where it is moving to the adjacent lane.

Instead of setting the parameters for the Kalman filter, the estimation unit 113 may add a weight to the physical quantity acquired by the recognition unit 111 and input the resultant value to the Kalman filter. More specifically, the estimation unit 113 may add weights to the lateral position Py, the lateral velocity Vy, and the lateral acceleration Ay so that the responsiveness to the lateral position Py, the lateral velocity Vy, and the lateral acceleration Ay increases. For example, the estimation unit 113 may add weights to the lateral position Py, the lateral velocity Vy, and the lateral acceleration Ay so that their absolute values increase. Alternatively, the estimation unit 113 may add a weight to only one of the lateral position Py, the lateral velocity Vy, and the lateral acceleration Ay.

Figure 7A:
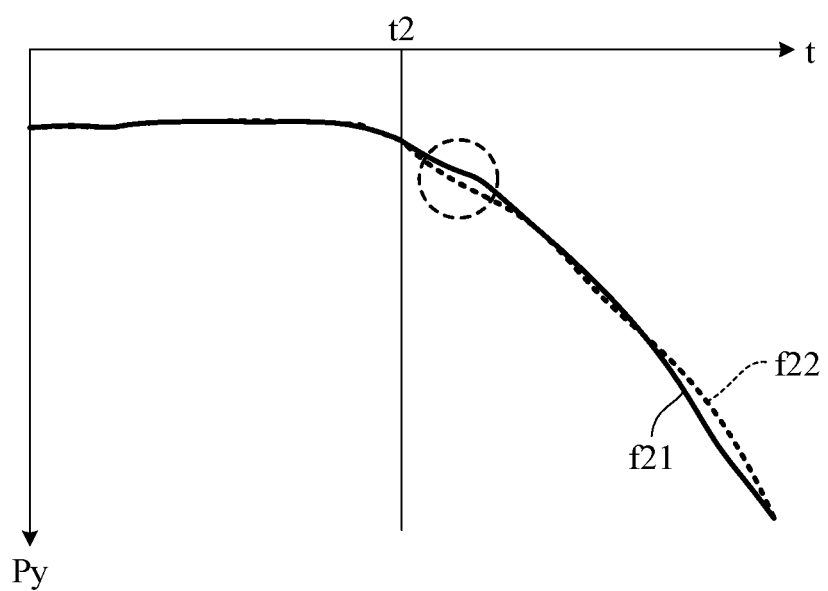
FIG. 7A is a diagram of an example of a calculated result from the Kalman filter set to the leaving determination model.
Figure 7B:
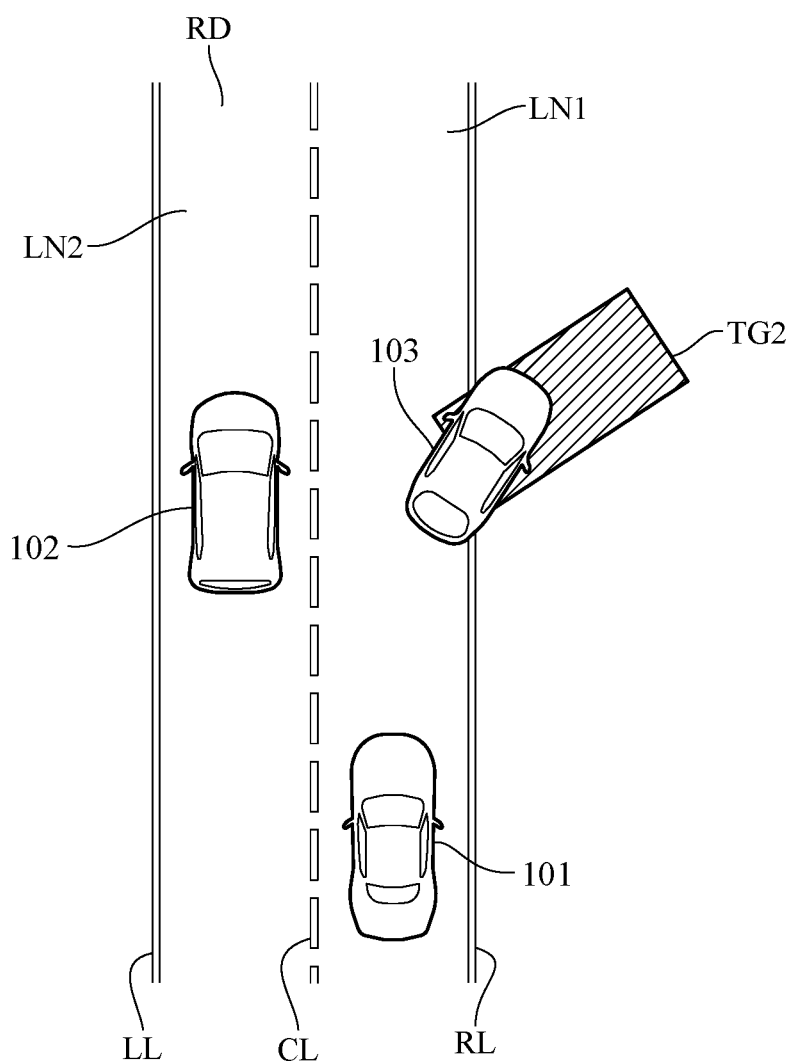
FIG. 7B is a diagram used to explain a calculated result from the Kalman filter set to the leaving determination model.

FIG. 7A is a diagram of an example of a calculated result from the Kalman filter set to the leaving determination model. FIG. 7A illustrates the lateral position Py of the preceding vehicle 103 estimated through the Kalman filter set to the leaving determination model, in a traveling scene similar to that in FIG. 6A. In the graph of FIG. 7A, the vertical axis represents the lateral position Py of the preceding vehicle 103, and the horizontal axis represents a time t. A time t2 represents a time point at which the preceding vehicle 103 starts turning right. A characteristic f21 represents a sensor value, more specifically, the lateral position Py of the preceding vehicle 103 recognized based on the camera image from the camera 1a. A characteristic f22 represents a calculated result from the Kalman filter, namely, the lateral position Py of the preceding vehicle 103 estimated through the Kalman filter. As can be seen from the area surrounded by a broken line circle in FIG. 7A, the lateral position Py of the preceding vehicle 103 estimated through the Kalman filter set to the leaving determination model is misrecognized as being shifted from the actual position indicated by the sensor value toward the right side (lower side in FIG. 7A) in the traveling direction, after the time t2. FIG. 7B is a diagram used to explain a calculated result from the Kalman filter set to the leaving determination model. In FIG. 7B, a rectangle TG2 schematically represents a traveling position of the preceding vehicle 103 estimated through the Kalman filter set to the leaving determination model.

The actuator control unit 114 makes a leaving determination based on an estimated result from the estimation unit 113. The leaving determination refers to a determination as to whether, when the subject vehicle 101 reaches the longitudinal position Px of the preceding vehicle 103 that is turning right, a space large enough for the subject vehicle 101 to pass therethrough (or a space sufficiently larger than the size of the subject vehicle 101 in the lane width direction) will be present on the left side of the preceding vehicle 103. In this case, the actuator control unit 114 may make the leaving determination in consideration of a situation around the preceding vehicle 103. For example, when the other vehicle 102 is traveling in the adjacent lane LN2 as illustrated in FIG. 7B, the actuator control unit 114 may determine whether a space large enough for the subject vehicle 101 to pass therethrough is present between the preceding vehicle 103 and the other vehicle 102, for example, based on the traveling position of the other vehicle 102.

When determining that a space large enough for the subject vehicle 101 to pass therethrough is present on the left side of the preceding vehicle 103 as a result of making the leaving determination, the actuator control unit 114 controls each actuator AC to make the subject vehicle 101 accelerate.

Figure 8:
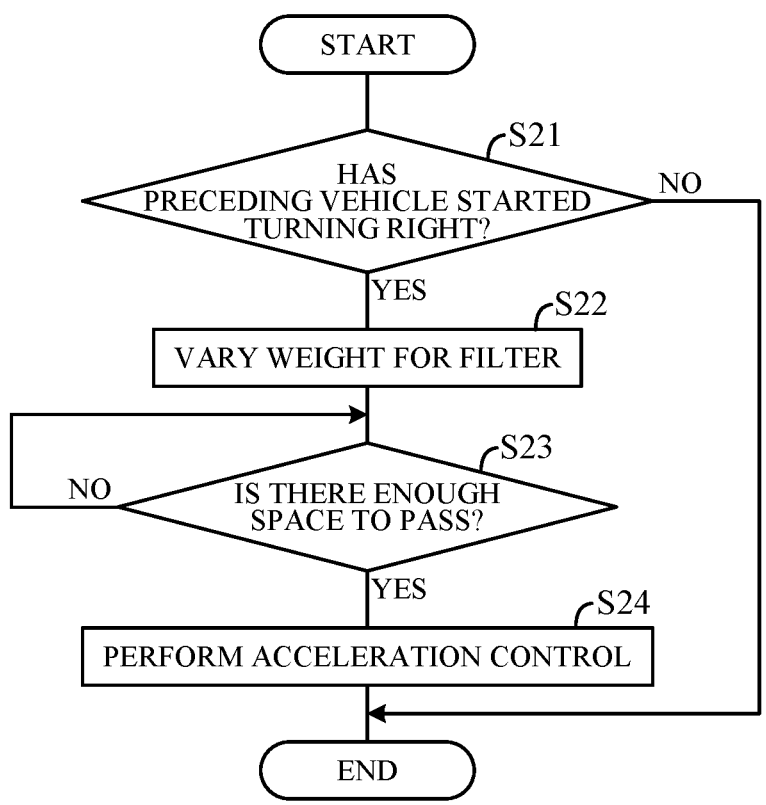
FIG. 8 is a flowchart of another example of the process performed by the controller in FIG. 3.

FIG. 8 is a flowchart of another example of the process performed by the controller 10. The process depicted in this flowchart is repeated at a predetermined cycle, for example, when the following travel function of the subject vehicle 101 is activated. Here, an example traveling scene in which the subject vehicle 101 is following the preceding vehicle 103, as illustrated in FIG. 2A, will be explained. When the following travel function of the subject vehicle 101 is activated, the Kalman filter is set to the steady travel model.

In Step S21, the controller 10 first determines whether the preceding vehicle 103 has started turning right, based on a camera image. When the determined result is negative (NO) in Step S21, the controller 10 terminates this process. When the determined result is positive (YES) in Step S21, the controller 10 varies the weight for the Kalman filter in Step S22. More specifically, the controller 10 switches the Kalman filter from the steady travel model to the leaving determination model. In Step S23, the controller 10 determines whether a space large enough for the subject vehicle 101 to pass therethrough is present on the left side of the preceding vehicle 103, based on the calculated result from the Kalman filter, namely, the traveling trajectory of the preceding vehicle 103 estimated through the Kalman filter. The controller 10 repeats Step S23 until the determined result becomes positive. When the determined result becomes positive in Step S23, the controller 10 performs acceleration control. Concretely, the controller 10 controls each actuator AC to make the subject vehicle 101 accelerate, in Step S24. As a result, when the preceding vehicle 103 followed by the subject vehicle 101 starts leaving the current lane LN1 as in the scene of FIG. 7B, the subject vehicle 101 can start acceleration in order to pass by the left side of the preceding vehicle 103 before the preceding vehicle 103 finishes leaving the current lane LN1. Consequently, it is possible to achieve smooth road traffic and prevent a passenger in the subject vehicle 101 from feeling uncomfortable. It should be noted that, after the subject vehicle 101 has passed by the left side of the preceding vehicle 103 and finished the acceleration, the controller 10 switches the Kalman filter to the steady travel model.

According to the foregoing embodiment, the travel control apparatus 50 successfully provides the following functions and effects.

(1) The travel control apparatus 50 includes: a camera 1a that detects an exterior environment situation around a subject vehicle 101; a recognition unit 111 that recognizes, based on a detected value (camera image) of the camera 1a, a traveling state of a preceding vehicle 103 traveling ahead of the subject vehicle 101 on a current lane LN1 on which the subject vehicle 101 is traveling; a determination unit 112 that determines, based on a recognized result from the recognition unit 111, whether the preceding vehicle 103 has started making a turn; an estimation unit 113 that estimates a traveling trajectory of the preceding vehicle 103 through a Kalman filter to which a physical quantity that represents a traveling state of the preceding vehicle 103 is to be inputted as an input value; and an actuator control unit 114 that controls a traveling actuator AC based on an estimated result from the estimation unit 113 to make the subject vehicle 101 follow the preceding vehicle 103. When the determination unit 112 determines that the preceding vehicle 103 has started making the turn, the estimation unit 113 varies a weight for the Kalman filter. A physical quantity that represents the traveling state of the preceding vehicle 103 encompasses at least one of a traveling velocity, a traveling position, and a traveling acceleration in a lane width direction of the preceding vehicle 103. To vary the weight for the Kalman filter, the estimation unit 113 adds the weight to this physical quantity and then inputs the resultant value in the Kalman filter or varies a parameter for the Kalman filter in accordance with the physical quantity. In this way, the subject vehicle 101 can re-accelerate after the preceding vehicle 103 has started leaving the current lane LN1 and before it finishes leaving the current lane LN1, thereby maintaining smooth traffic.

(2) The recognition unit 111 recognizes a blinking state of a direction indicator in the preceding vehicle 103 based on the camera image from the camera 1a and then recognizes a turning direction of the preceding vehicle 103 based on the blinking state. When determining that the preceding vehicle 103 have started making the turn, the determination unit 112 further determines which side the preceding vehicle 103 will turn, right or left, based on the turning direction of the preceding vehicle 103 recognized by the recognition unit 111. In this way, it is possible to promptly recognize that the preceding vehicle 103 will turn right or left by determining which direction the preceding vehicle 103 will turn based on the camera image, instead of based on the calculated result from the Kalman filter.

(3) The recognition unit 111 further recognizes division lines LL, CL, and RL defining a road RD on which the subject vehicle 101 is traveling, based on the camera image from the camera 1a. The determination unit 112 then determines whether an adjacent lane is present on the turning direction of the current lane LN1 to which the preceding vehicle 103 is traveling, based on the recognized result from the recognition unit 111. When the adjacent lane is not present on the turning direction of the preceding vehicle 103, the determination unit 112 determines that the preceding vehicle 103 will make a turn toward the turning direction. In this way, the travel control apparatus 50 can prevent the determination unit 112 from erroneously determining that the preceding vehicle 103 will make a turn when the preceding vehicle 103 changes lanes. Consequently, it is possible to accurately determine that the preceding vehicle 103 will make a turn.

The foregoing embodiment can be modified into various forms. Some conceivable modifications will be described below.

In the foregoing embodiment, the recognition unit 111, which serves as a state recognition unit, recognizes a traveling state of the preceding vehicle 103 based on a camera image from the camera 1a, which serves as a detection unit. Alternatively, if the detection unit is a LiDAR or radar instead of the camera 1a, the state recognition unit may recognize a traveling state of the preceding vehicle 103 based on a detected value from the LiDAR or radar.

In the foregoing embodiment, the determination unit 112 determines that the preceding vehicle 103 has started deceleration when the recognition unit 111 recognizes that the traveling state of the preceding vehicle 103 has changed from steady traveling to deceleration traveling. Alternatively, the determination unit 112 may determine that the preceding vehicle 103 has started deceleration when the recognition unit 111 recognizes that a brake lamp provided at the rear of the preceding vehicle 103 changes from an off state to an on state.

In the foregoing embodiment, the recognition unit 111, which serves as a division line recognition unit, recognizes the division lines LL, CL, and RL defining the road RD on which the subject vehicle 101 is traveling, based on a camera image from the camera 1a. Alternatively, the division line recognition unit may recognize the division lines LL, CL, and RL defining the road RD on which the subject vehicle 101 is traveling, based on map information stored in the memory unit 12.

In the foregoing embodiment, the travel control apparatus 50 is applied to a self-driving vehicle; however, the travel control apparatus 50 is also applicable to other types of vehicles. For example, the travel control apparatus 50 is also applicable to manual driving vehicles equipped with advanced driver-assistance systems (ADAS).

The above embodiment can be combined as desired with one or more of the above modifications. The modifications can also be combined with one another.

According to the present invention, acceleration/deceleration control can be performed appropriately in accordance with traffic flow.

Above, while the present invention has been described with reference to the preferred embodiments thereof, it will be understood, by those skilled in the art, that various changes and modifications may be made thereto without departing from the scope of the appended claims.

What is claimed is:

1. A travel control apparatus comprising:
a detection unit configured to detect an exterior environment situation around a subject vehicle, the detection unit being a camera, a radar, or a LiDAR; and
a microprocessor and a memory coupled to the microprocessor, wherein
the microprocessor is configured to perform:
recognizing, based on a detected value of the detection unit, a traveling state of a preceding vehicle traveling ahead of the subject vehicle on a current lane on which the subject vehicle is traveling;
determining, based on a recognized result in the recognizing, whether the preceding vehicle has started a deceleration;
estimating a traveling trajectory of the preceding vehicle through a Kalman filter to which a physical quantity representing the traveling state of the preceding vehicle is to be inputted as an input value; and
controlling a traveling actuator based on an estimated result in the estimating to make the subject vehicle follow the preceding vehicle, wherein
the microprocessor is configured to perform
the estimating including, when it is determined that the preceding vehicle has started the deceleration, varying a weight for the Kalman filter by resetting a variance-covariance matrix of the Kalman filter.

2. The travel control apparatus according to claim 1, wherein
the physical quantity includes at least one of a traveling velocity, a traveling position, and a traveling acceleration in a traveling direction of the preceding vehicle, and
the resetting the variance-covariance matrix includes setting the variance-covariance matrix so that responsiveness to the physical quantity increases.

3. The travel control apparatus according to claim 1, wherein
the Kalman filter includes a first model and a second model having a different responsiveness to the physical quantity,
the responsiveness of the second model is higher than the responsiveness of the first model, and
the resetting the variance-covariance matrix includes switching from the first model to the second model.

4. A travel control apparatus comprising:
a detection unit configured to detect an exterior environment situation around a subject vehicle, the detection unit being a camera, a radar, or a LiDAR; and
a microprocessor and a memory coupled to the microprocessor, wherein
the microprocessor is configured to function as:
a state recognition unit configured to recognize, based on a detected value of the detection unit, a traveling state of a preceding vehicle traveling ahead of the subject vehicle on a current lane on which the subject vehicle is traveling;
a determination unit configured to determine, based on a recognized result from the state recognition unit, whether the preceding vehicle has started a deceleration;
an estimation unit configured to estimate a traveling trajectory of the preceding vehicle through a Kalman filter to which a physical quantity representing the traveling state of the preceding vehicle is to be inputted as an input value; and
an actuator control unit configured to control a traveling actuator based on an estimated result from the estimation unit to make the subject vehicle follow the preceding vehicle, wherein
when the determination unit determines that the preceding vehicle has started the deceleration, the estimation unit varies a weight for the Kalman filter by resetting a variance-covariance matrix of the Kalman filter.

5. The travel control apparatus according to claim 4, wherein
the physical quantity includes at least one of a traveling velocity, a traveling position, and a traveling acceleration in a traveling direction of the preceding vehicle, and
the resetting the variance-covariance matrix includes setting the variance-covariance matrix so that responsiveness to the physical quantity increases.

* * * * *